(12) United States Patent
Biermans

(10) Patent No.: US 7,540,962 B2
(45) Date of Patent: Jun. 2, 2009

(54) METHOD OF PREPARING SPHEROID POLYMER PARTICLES HAVING A NARROW SIZE DISTRIBUTION BY DISPERSION POLYMERIZATION, PARTICLES OBTAINABLE BY THE METHOD AND USE OF THESE PARTICLES

(75) Inventor: Frans Biermans, Vlissingen (NL)

(73) Assignee: Varian, B.V., Middelburg (NL)

( * ) Notice: Subject to any disclaimer, the term of this patent is extended or adjusted under 35 U.S.C. 154(b) by 88 days.

(21) Appl. No.: 11/809,096

(22) Filed: May 31, 2007

(65) Prior Publication Data
US 2007/0295655 A1    Dec. 27, 2007

(30) Foreign Application Priority Data
Jun. 2, 2006    (EP)    .................... 06076151

(51) Int. Cl.
*B01D 15/08* (2006.01)
(52) U.S. Cl. .............. 210/635; 210/656; 210/198.2; 210/502.1; 521/25; 521/31; 521/38; 526/336; 526/346
(58) Field of Classification Search ........... 210/635, 210/656, 659, 198.2, 502.1; 521/25, 31, 521/38; 526/336, 346
See application file for complete search history.

(56) References Cited

U.S. PATENT DOCUMENTS

| | | | |
|---|---|---|---|
| 5,104,764 A | 4/1992 | Wada et al. | |
| 5,130,343 A | 7/1992 | Frechet et al. | |
| 5,216,096 A | 6/1993 | Hattori et al. | |
| 6,071,975 A * | 6/2000 | Halloran | 516/58 |
| 6,399,701 B1 | 6/2002 | Enright et al. | |
| 6,533,939 B2 | 3/2003 | Shimbo et al. | |
| 6,855,761 B2 | 2/2005 | Muranaka et al. | |
| 7,319,125 B2 * | 1/2008 | Arjunan et al. | 526/127 |
| 2002/0071869 A1* | 6/2002 | Bures et al. | 424/487 |
| 2004/0082744 A1 | 4/2004 | Klipper et al. | |

OTHER PUBLICATIONS

Erbay et al., "Pore Memory of Macroporous Styrene-Divinylbenzene Copolymers", Journal of Applied Polymer Science, vol. 71, 1055-1062 (1999).

Kitahara et al., "Preparation of Monodispersed Porous Polymers Resins and Their Application to Stationary Phases for High-Performance Liquid Chromatographic Separation of Carbohydrates", Analylical Sciences, vol. 17 Supplement, 2007 (I1225-I228).

Coutinho et al., "Copolymers Based on Styrene and Divinylbenzene Synthesized in the Presence of Depha—I. Structural Characterization", Eur. Polym. J. vol. 31, No. 12, pp. 1243-1250 (1995).

* cited by examiner

*Primary Examiner*—Ernest G Therkorn
(74) *Attorney, Agent, or Firm*—Bella Fishman

(57) ABSTRACT

The invention relates to a method of preparing spheroid polymer particles having a narrow size distribution by dispersion polymerization. This method comprises the steps of: providing a two-phase system in the form of a dispersion comprising an organic phase of droplets dispersed in an aqueous medium, mixing said organic phase in said aqueous medium under agitation without using a dispersion stabilizing agent to stabilize the dispersion, wherein the organic phase comprises at least a crosslinkable monomer, a polymerization initiator and an organic solvent for said monomer, and allowing the crosslinkable monomers to polymerize, while the two-phase system is agitated.

8 Claims, 6 Drawing Sheets

METHOD OF PREPARING SPHEROID POLYMER PARTICLES HAVING A NARROW SIZE DISTRIBUTION BY DISPERSION POLYMERIZATION, PARTICLES OBTAINABLE BY THE METHOD AND USE OF THESE PARTICLES

FIELD OF THE INVENTION

According to a first aspect the invention relates to a method of preparing spheroid polymer particles having a narrow size distribution by dispersion polymerization.

BACKGROUND OF THE INVENTION

In the field of chromatography, spheroid polymer particles are widely used as packing material to form chromatographic columns. Generally chromatographic materials can be silica based or polymer based. The shape of these particles can be irregular or spherical. The particles may be porous, superficially porous or non-porous. More recently monolithic materials based on silica or polymer have been developed which consist of 'one porous block' of material.

The characteristics of chromatographic action of the packed spheroid particles are in one aspect related to the size distribution of the particles. Other aspects of separation by chromatography encompass certain surface characteristics such as functional groups (in fact: the chemical character of the surface), physical character of the surface (e.g. vacancies in the surface area, morphology, adhesion aspects etc.).

In general the following characteristics may apply to a chromatographic material:
  the particle shape: spherical particles are more easy to pack into a column giving a more homogeneous packing bed, thus generating a better separation performance.
  the particle size: in general smaller particles generate sharper peaks and a better separation efficiency, but they generate a higher backpressure (resistance to flow through the column).
  pore size and pore volume: a porous structure generates internal surface, thus enlarging the effective chromatographic surface.

Often, when relatively large compounds like biomolecules are to be separated on a porous material, there is a need for very large pores to allow unhindered diffusion of the compounds in and out of the pores. Small pores or pores with sizes in the range of the separated compounds may give a hindered diffusion in and out of the pores. This will result in broad peaks and a less efficient separation. However, the need for these very large pores to allow unhindered diffusion may induce another drawback. As the pores in a chromatographic material become larger the material may become mechanically weaker. At high pressure such as in long columns and/or at high flow rates the particles may crush.

Polymer particles for use as chromatographic material are usually prepared by so-called dispersion polymerization, also referred to as suspension polymerization (E. Erbay and O. Okay, J. Appl. Poly. Sci. 71, (1999)1055-1062). During this process little globules of polymer precursors are formed, which consist of monomers dissolved in an appropriate organic solvent, which nuclei are dispersed in a water based medium, so that an oil-in-water dispersion is present, wherein the organic phase is the discontinuous medium and water is the continuous medium.

A generally recognized drawback of dispersion polymerization is that dispersion polymerization leads to particles having a widely spread size distribution, also referred to as a broad size distribution. See e.g. the above article from E. Erbay and O. Okay and further Kithara et al., Anal. Sci., Vol 17 supplement 2001, p. 1225-1228), Coutinho et al., Eur. Polym. J., 31, (1995), p. 1243-1250. The art has proposed to solve this issue by performing a tedious size classification step after the actual polymerization, which can be roughly interpreted as an act of sieving, or size selection. See e.g. U.S. Pat. Nos. 5,130,343 and 6,533,939, as well as EP 0 534 057. An alternative solution that has been used is to use specifically sized seed particles from which the particles grow. See also e.g. U.S. Pat. No. 6,855,761.

There is a general need for a more uniform—or, in other words, narrow—size distribution of products obtained by dispersion polymerization, because the narrower the size distribution of particles, the better their chromatographic performance.

The size distribution is dealt with in detail in this description later under the section summary of the invention, but for now it is important to introduce the ratio F being a measure for size distribution that is used in respect of the present polymer particles. It is generally accepted in the field of chromatography that this ratio F preferably should be of a value of 2 or lower. This ratio can be achieved by either of the above two methods of classification and seeding. Here it is noted that one can also perform chromatography when F< or > than 2. However, when too many little particles are present the backpressure of a chromatographic column will rise. When too many large particles are present the separation efficiency will drop.

The invention aims at improving the preparation of the above particles by providing a novel method by which the preparation can be performed in a relatively easy manner. In particular, it is an object of the invention to provide such a method wherein a tedious classification step or the use of seed particles as required in prior art methods to achieve a required size distribution of the polymer particles prepared may be omitted thereby reducing the costs. Also other objectives are set which are complied with, as will be explained infra.

SUMMARY OF THE INVENTION

The object of the invention is achieved in that the invention provides a method of preparing spheroid polymer particles having a narrow size distribution, by dispersion polymerization which comprises the steps of:
  providing a two-phase system in the form of a dispersion comprising an organic phase of droplets dispersed in an aqueous medium,
  mixing said organic phase in said aqueous medium under agitation without using a dispersion stabilizing agent to stabilize the dispersion, wherein the organic phase comprises at least a crosslinkable monomer, a polymerization initiator and an organic solvent for said monomer; and
  allowing the crosslinkable monomers to polymerize, while the two-phase system is agitated.

Surprisingly, the method according to the invention accomplishes a size distribution narrower than known in the art without the need of a costly classification step or expensive synthesis of seeding particles. The method according to the invention is less complicated than prior art methods, thereby offering an easy way to prepare spheroid polymer particles useful as chromatographic material. In the method according to the invention one refrains from the (generally regarded necessary) use of a dispersion stabilizing agent, which is generally regarded an essential ingredient for dispersion polymerization. As will be shown below, particles obtained by the method according to the invention show a more uniform (i.e. narrower) size distribution, compared to particles derived from a conventional dispersion polymerization method. The absence of a dispersion stabilizing agent in the method according to the invention is beneficial, as a stabilizing agent tends to give more "fines" in the final product. In addition, the particles obtained show an irregular surface structure, in the sense that it appears on SEM photographs as an undulating area, comprising microscopic caves, creases, dents and peaks. The chromatographic material obtained according to the invention is advantageously used with relatively large compounds such as biomolecules, e.g. proteins or DNA fragments. In fact, these particles packed in columns have proven expedient for preparative chromatography or "solid phase extraction" (SPE), because of low back-pressure. This is of particular interest in regard of biomolecule (protein) separation. A low back-pressure allows for a higher flow rate over a column, a shorter elution time, while maintaining a satisfying separation.

Microscopic evaluation has shown that the surface of the particles obtained is very rough, which is believed to be favorable for separating biomolecules because a relatively large surface is present for interaction with such biomolecules. The fact that the material has a relatively low back-pressure may result from the fact that the interstitial space between the particles, when packed, is somewhat larger because of this roughness. The more solid core of the particles is believed to be less porous and provides mechanical strength, which may prevent the particles from crushing when long columns or high flowrates are used.

BRIEF DESCRIPTION OF THE DRAWINGS

The attached figures, as referred to in the below examples, are.

Figure 3:
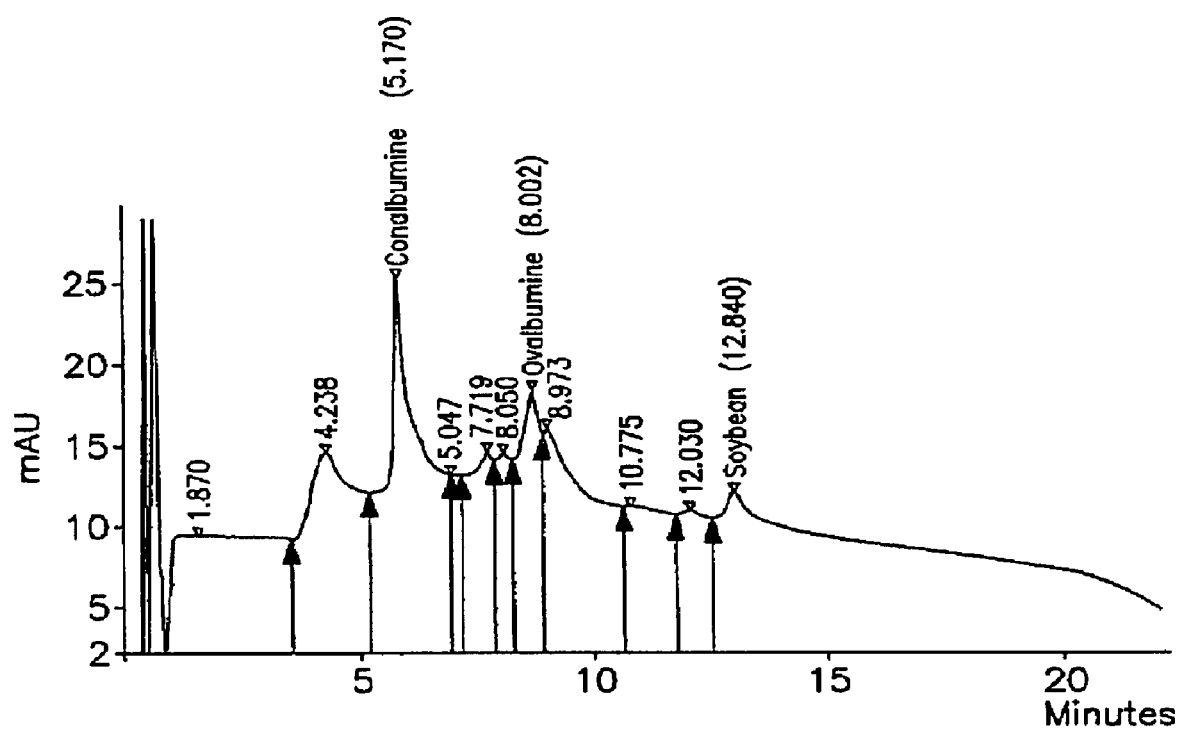
FIG. 3 is a chromatogram of a protein separation over a column packed with chemically modified particles according to the invention.

The chromatograms except the one in FIG. 3, are made with the particles prepared according to the invention without surface modification. The separations illustrated in FIGS. 4, 5 and 6 were performed in the so-called "reversed phase mode". No ionic groups are present.

DETAILED DESCRIPTION OF THE INVENTION

For clarity's sake, it is explained that in respect of the invention:

the expression "at least a crosslinkable monomer" denotes a crosslinkable monomer of one type, but also includes crosslinkable monomers of different types, which allows for the preparation of co-polymer particles. The monomer is not soluble in the water phase;

"without using a dispersion stabilizing agent to stabilize the dispersion" means either the absence of the dispersion stabilizing agent, or a content of this component which is non-effective in stabilizing the dispersion, in general a content below 0.1 wt. % of the weight of the aqueous medium is regarded a non-effective content;

the "dispersion stabilizing agent" is in the art also indicated as an emulsifying agent, and usually is a water soluble polymer like polyvinylalcohol or cellulose;

the 'narrowness' of the size distribution of particles is defined according to the following ratio F:

$$F=dp(\%<90)/dp(\%<10)$$

wherein preferably F should be 2 or lower for chromatography purposes as described supra, and wherein dp is the particle diameter (in microns) and wherein $dp(\%<90)$ and $dp(\%<10)$, respectively, designate the top-limit for a group of particles and the bottom-limit for a group of particles, with $dp(\%<90)$ being a value of a particle size below which 90% of the particles are smaller in size, and, $dp(\%<10)$ being a value of a particle size below which 10% of the particles are smaller.

Advantageously, the cross-linkable monomer is a hydrocarbon comprising at least two vinyl groups, more preferably a polyvinyl aromatic compound. The cross-linkable monomer is also referred to as cross-linker.

More preferably, the organic phase comprises at least two different monomers, one of which is the cross-linkable monomer and the second one is a polymerizable monomer advantageously comprising one vinyl group, more preferably a monovinyl aromatic compound. In other words, in the method according to the invention the organic phase preferably comprises at least two monomers, one of which functions as a crosslinker. The workable range and optimum ratio of the different monomers can be determined experimentally. If the amount of the crosslinker is too high, the particles will become more stiff but possibly also more brittle, risking rupture and disintegration of the particles. If the amount of crosslinker is too low, there is a risk that the particles will become flexible. When such flexible particles are packed into a column, the risk of increasing backpressure to an unacceptable level is raised as the particles will deform under pressure.

Examples of a polyvinyl aromatic compound which may be used include divinyl benzene, divinyl toluene, divinyl xylene, divinylnaphthalene, divinyl ethylbenzene and trivinyl benzene. Other suitable compounds for the at least one crosslinkable monomer comprise (bis)(meth)acrylates, (bis) acrylamides, (bis)vinylesters and (bis)vinylethers. A preferred example of a crosslinker is divinylbenzene (DVB) and derivatives thereof.

The monovinyl monomer is preferably an aromatic compound in view of chemical modification possibilities exemplified by styrene and nucleus-substituted styrenes, such as methylstyrene, dimethylstyrene, ethylvinyl benzene, chlorostyrene, vinylnaphthalene, methyl vinylnaphthalene and secbutylstyrene. Preferred examples comprise styrene (ST) and derivatives thereof. The polyvinyl aromatic compound (co)polymerizes with the monovinyl aromatic compound and acts as a cross-linking agent.

The preferred combination used in the invention is styrene (ST) and divinylbenzene (DVB) providing co-polymeric particle structures because of the mechanical strength of such a polymeric system. The DVB-ST aromatic polymeric network obtained is very 'stiff' and rigid in its nature. It is very deformation resistant. Other options are the use of (substituted) acrylates in combination with bis-acrylates, substituted acrylamides with bis-acrylamides, etc.

In another preferred method according to the invention, a free radical initiator is used to achieve good results in dispersion polymerization in regard of the final products obtained. Specific initiators of use include azonitril initiators like azoisobutyronitrile (AIBN), added in solution in a polar hydrocarbon solvent like dioxane, THF or a solvent like toluene. Other classes of initiators include alkylperoxides, acylperoxides, peresters or percarbonates. Such initiators can be used as well, as long as they are not soluble in the water/salt mixture to be described.

A further preferred method according to the invention involves the use of a dissolved salt in the aqueous medium. It is assumed that the salt dissolved in the water based medium influences the formation of particles and their characteristic surface structure in a positive way, avoiding the occurrence of a not negligible amount of misformed particles and/or relatively badly defined particles. Water soluble salts useful in the invention are exemplified by the alkali metal salts, in particular sodium and potassium, and ammonium salts provided that they do not dissolve in the organic phase and do not interfere with the radical induced suspension polymerization. Preferred soluble salts comprise NaCl, KCl, KBr and NaBr. Usually a content of about 20 wt. % salt, e.g. NaCl, is used relative to the total weight of the medium. However, a broader range of 2-30 wt. % is in general applicable.

A preferred solvent for use in the method according to the invention is chosen from the group consisting of aliphatic hydrocarbons, aliphatic hycrocarbons with a hydroxyl group or a combination thereof. These preferred solvents are a non-solvent for oligomers that are formed during polymerization, which helps the process of dispersion polymerization, i.e. the formation of particles. Specific examples include 1-decanol and decane.

The chromatographic particles may be modified. In one preferred embodiment thereof the surface of the polymer particles is chemically modified into an ion exchange material. The surface modified polymer particles are advantageously obtained after the dispersion polymerization. The modification can for instance be performed as a chloromethylation, i.e. attachment of a chloromethyl group, e.g. chloromethylene, to the benzene moiety and substitution of the chloro leaving-group, by a tertiary ammonium group. Other modifications contemplated especially for DVB/ST particles comprise alkylation, bromination, nitration, acylation and conversion to cation exchange materials by sulfonation. The latter particles suitable for chromatography purposes have specific ion exchange qualities.

In a second aspect, the invention pertains to a spheroid polymer particle obtainable by the method according to the invention. As already explained above, the particles obtained by the method of the invention have two distinct qualities over the prior art:

a narrow size distribution, i.e. the range of diameters of the spheroids is small, and the surface area has an undulating area, comprising microscopic caves, creases, dents and peaks.

A consequence of these qualities is that the particles provide a useful material for packing of chromatography columns, especially for preparative purposes, as explained above.

In addition, the spheroid polymer particle obtainable by the method according to the invention, may have a surface which is chemically modified into an ion exchange material as described above. The relevant advantages mentioned above apply.

In a preferred embodiment of the invention, the surface of the chemically modified spheroid polymer particles comprises quaternary ammonium groups. This surface modification renders the surface positively charged when used in chromatography, and makes this material particularly useful for protein separation over a column packed with this material in ion exchange mode.

In a third aspect, the invention pertains to a use of said spheroid polymer particles as a column packing material for chromatography, in particular for ion exchange chromatography. The relevant advantages mentioned above apply.

Preferably, the use according to the invention is directed to the chromatographic separation of biomolecules such as proteins or DNA fragments. As such, this separation has the advantage of a low back-pressure when used in columns containing the particles according to the invention, as explained above, which makes applications to the field of preparative chromatography, and especially preparative protein separation, highly advantageous.

Preferably, the spheroid polymer particles obtained according to the invention have a surface which is undulating providing roughness and interaction surface. It exhibits a surface structure distinct from the prior art. This surface structure accounts for a further enhancement of the separating quality of the particles when packed into chromatography columns.

The invention is further illustrated by reference to specific embodiments presented in the figures and examples presented below.

EXAMPLES

Example 1

Synthesis of Particles by Dispersion Polymerization in a One-Pot Reaction

A 5 liter four necked round-bottom flask equipped with a stirrer was charged with 2340 ml of a 20% (w/v) NaCl solution. To the stirred NaCl solution, a solution was added of 625.44 grams of divinylbenzene (DVB) and 623.67 grams of styrene (ST) in 258.65 grams of 1-decanol. Both divinylbenzene and styrene were freed from the phenolic stabilizer by filtration over silica. To the solution was added 2.60 grams of azoisobutyronitril (AIBN) dissolved in 66.95 grams of 1,4-dioxane. The mixture was stirred overnight at 70° C. in a water bath under a nitrogen atmosphere.

After polymerization, stirring was stopped and the particles were left to settle to the bottom of the flask. The clear supernatant was removed by suction and 2 liters of acetone were added. The particles were re-suspended. The suspension was refluxed for half an hour to extract the dioxane and 1-decanol out of the particles. After cooling, the suspension was transferred to a Buchner filter and the particles were collected by filtration. Washing with acetone, methanol-water and finally acetone gave a clear white filtercake that was transferred to a dish and left to dry in the oven at 60° C. A white powder was obtained.

Measurement of Size Distribution

Figure 1:
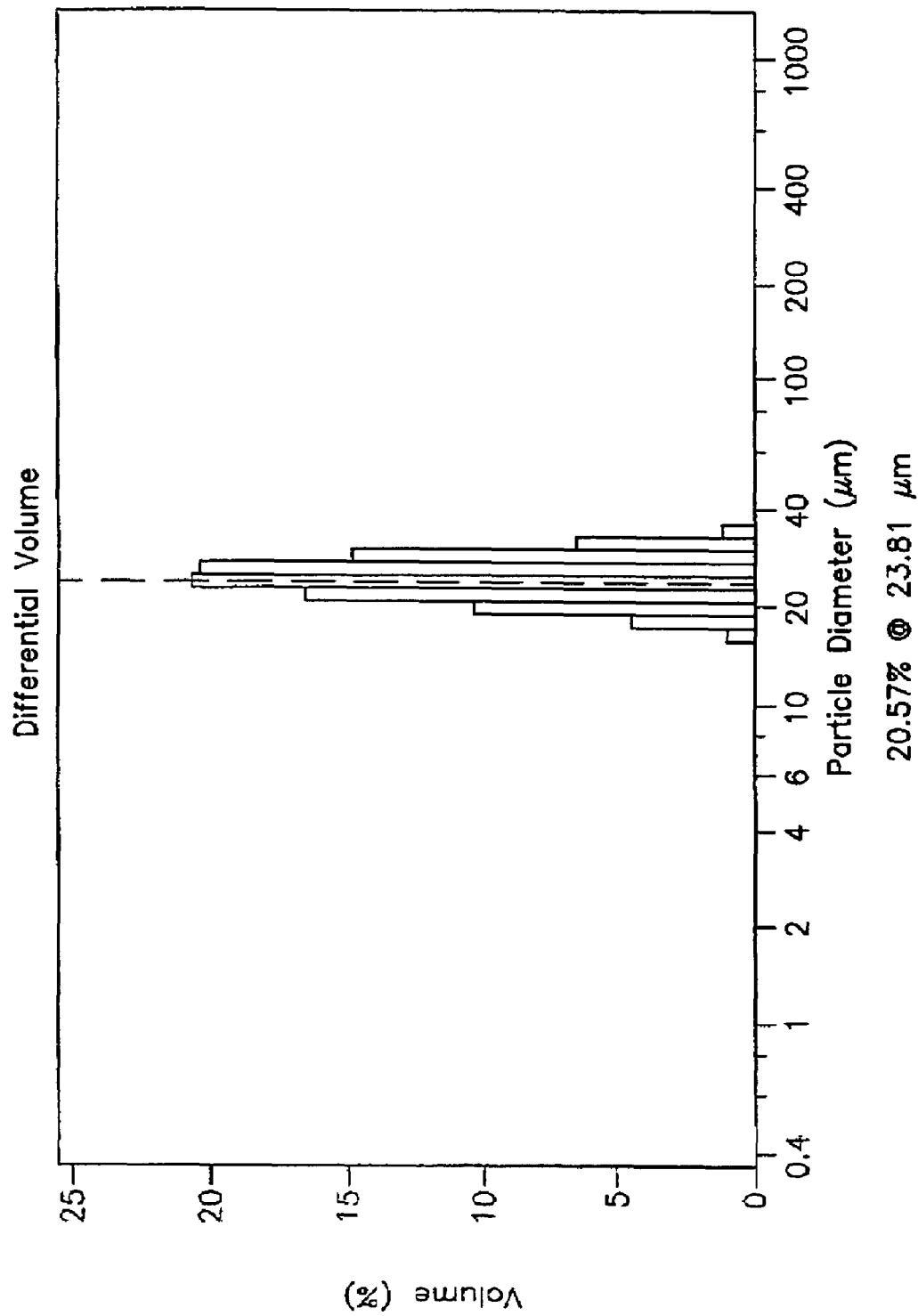
FIG. 1 is a graph of the size distribution of particles prepared by the method according to the invention.

The synthesized particles above were measured in respect of their size distribution. The result are shown in FIG. 1, which is a graph of the size distribution, showing on the x-axis the absolute size of particles in microns and on the y-axis the count of particles as a percent of volume. As apparent, the values were:

$dp(\%<90)=29.66$, $dp(\%<10)=18.92$, resulting in a $F$-value of 1.56.

Figure 2A:
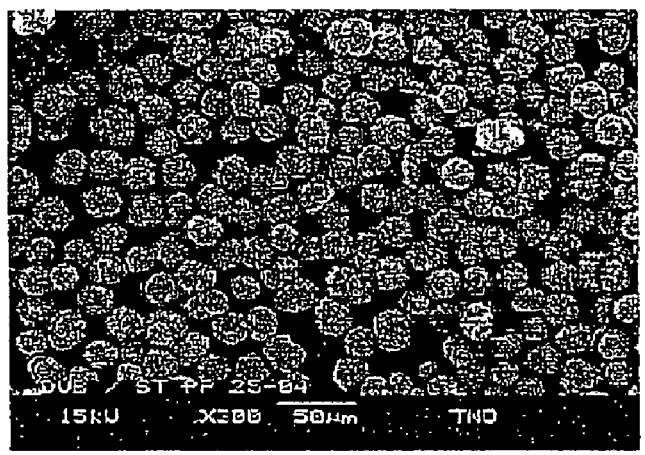
FIG. 2*a-c* are scanning electron microscope pictures of particles according to the invention.
Figure 2B:
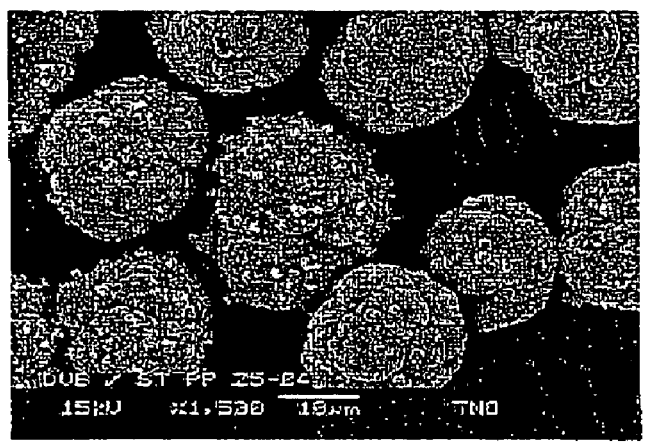
Figure 2C:
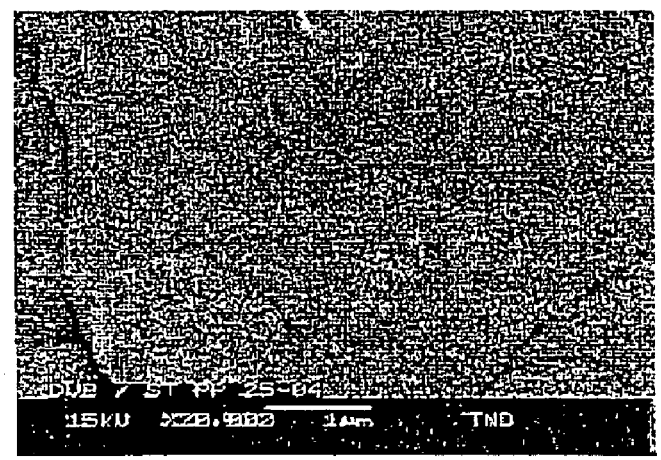

FIG. 2 is a scanning electron microscope picture of particles according to the invention, showing the rough surface structure.

Example 2

IEX Chromatography of Proteins on Spheroid DVB/ST Particles

Another application of the chromatographic usefulness of the spheroid DVB/ST particles is their conversion into an ion exchange material. This conversion was done by first chloromethylating the surface, and then reacting the chloromethyl groups with an tertiary amine, thereby creating particles bearing quaternary ammonium groups (scheme 1).

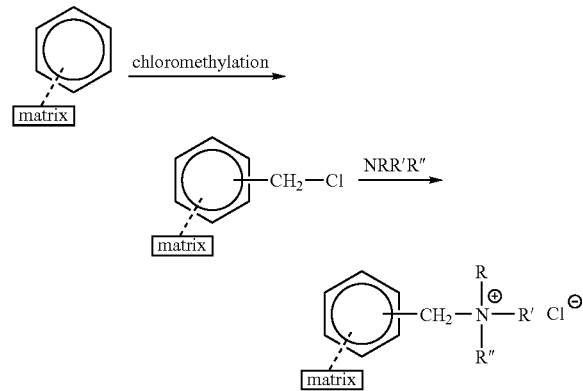

scheme 1

The particles thus modified are useful for protein purification in the IEX mode.

An example of a protein separation in the IEX mode is given in FIG. 3. The DVB/ST particles, synthesized as disclosed hereinabove, were chloromethylated and subsequently reacted with N,N-dimethylethanolamine according to scheme 1. The material was packed into a 150 cm×4.6 mm HPLC column and tested.

Figure 4:
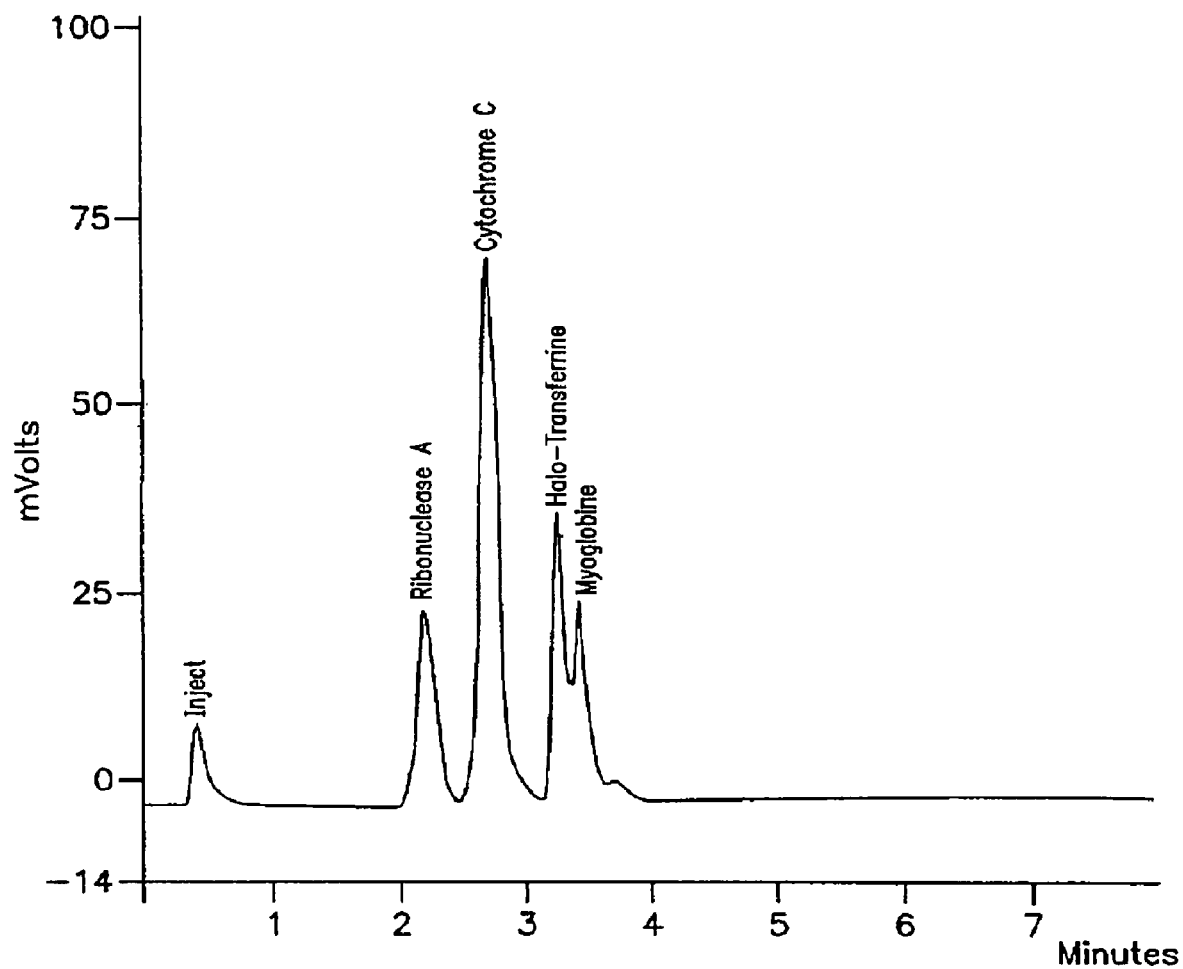
FIG. 4 shows a separation of four proteins, i.e. ribonuclease A, cytochrome C, holo-transferrin and myoglobin using particles according to the invention.

FIG. 4 shows a reversed phase separation of four proteins, i.e. ribonuclease A, cytochrome C, holo-transferrin and myoglobin, using spheroid DVB/ST particles prepared according to the invention.

Figure 5:
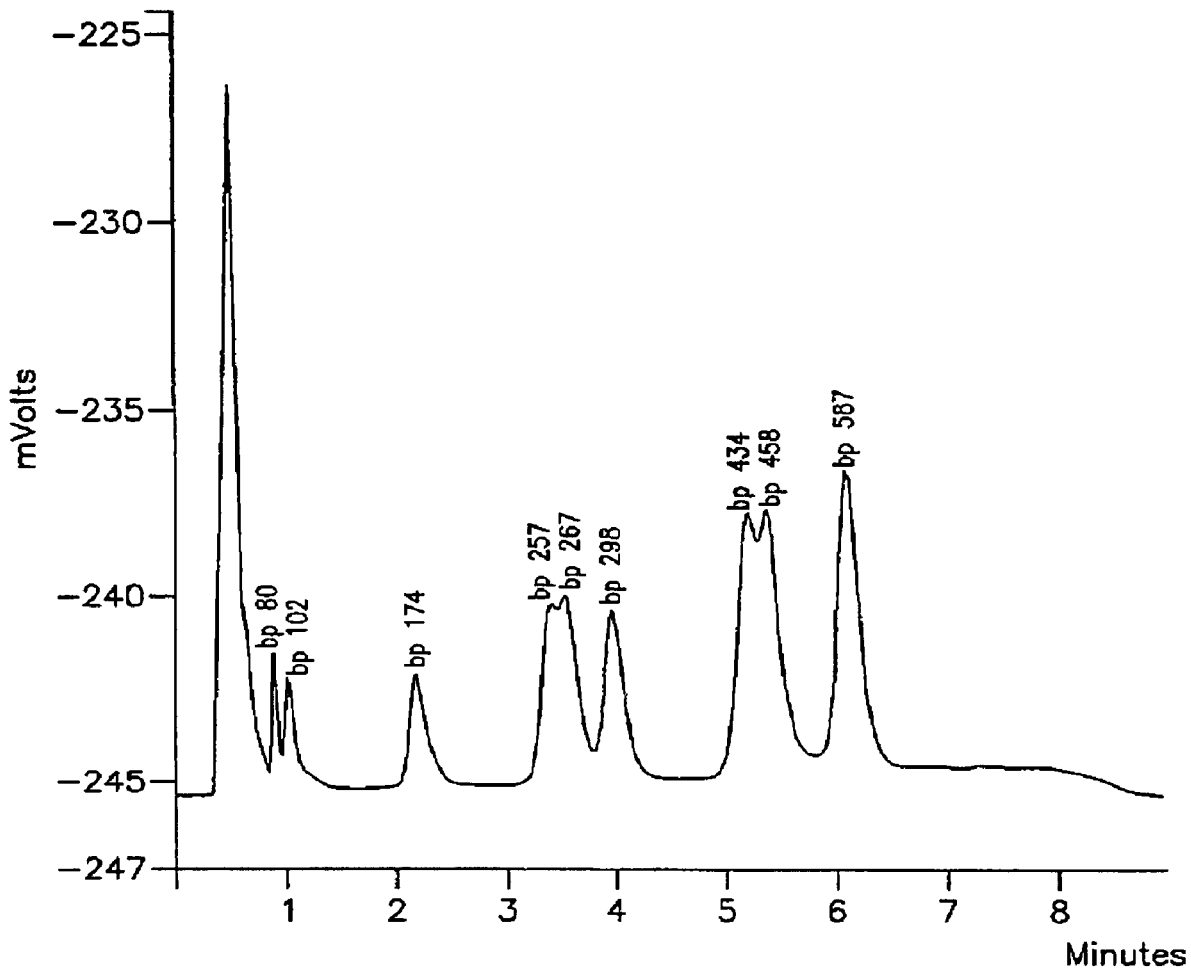
FIG. 5 shows a separation of DNA fragments, ranging in length from 80 base pairs to 587 base pairs using particles according to the invention.

FIG. 5 shows a reversed phase separation of DNA fragments, ranging in length from 80 basepairs to 587 base pairs using spheroid DVB/ST particles prepared according to the invention.

Figure 6:
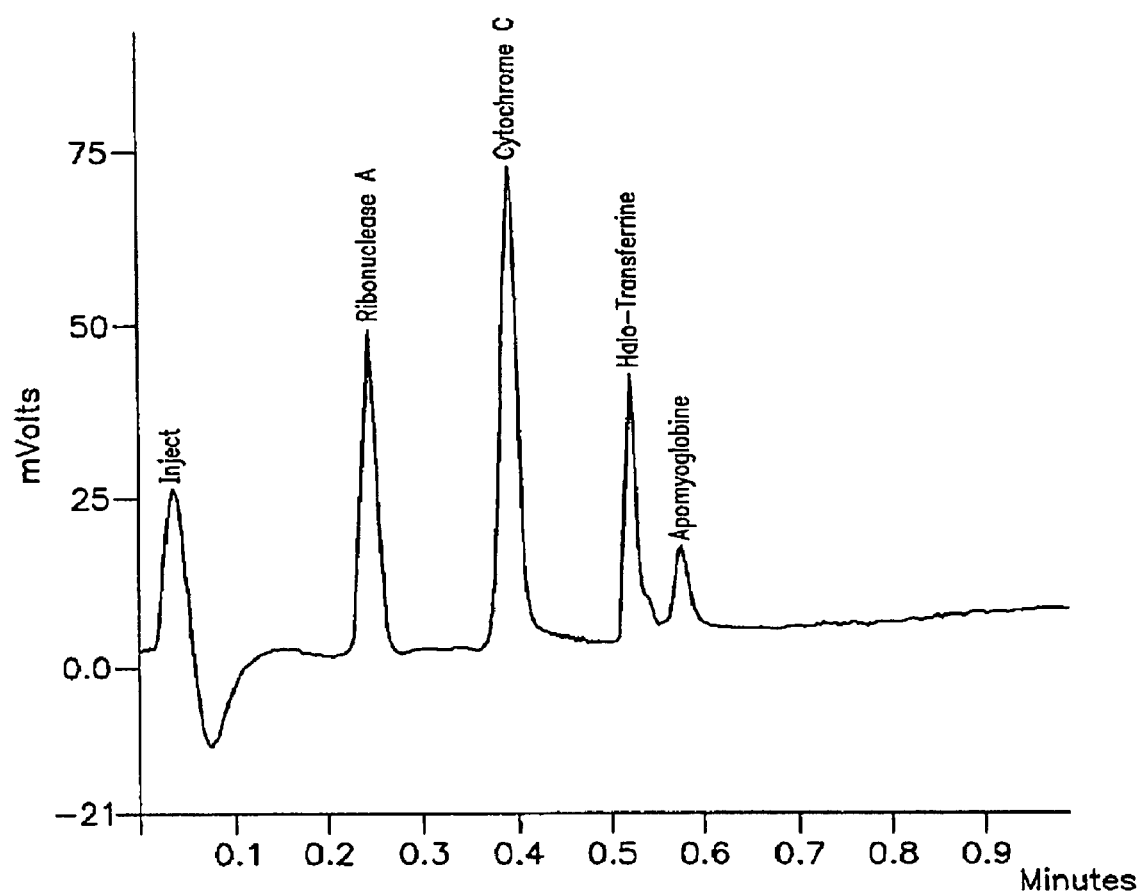
FIG. 6 shows an example of fast separation of proteins using the same proteins as in FIG. 4 using particles according to the invention at a very high flowrate.

FIG. 6 shows an example of fast separation—within 36 seconds—of proteins using the same proteins as in FIG. 4 at a very high flowrate. The very fast separation supports the idea that the separation takes place at the surface of the particles and that there is no diffusion of the proteins in and out of the particle. If this was the case, than the peaks would be very broad using this high flowrate.

What is claimed is:

1. Method of preparing spheroid polymer particles having a narrow particle size distribution by dispersion according to the ratio $F \leqq 2$, wherein $F=dp(\%<90)/dp(\%<10)$, wherein dp is the particle diameter in microns and wherein $dp(\%<90)$ and $dp(\%<10)$, respectively, designate the top-limit for a group of particles and the bottom-limit for a group of particles, with $dp(\%<90)$ being a value of a particle size below which 90% of the particles are smaller in size, and, $dp(\%<10)$ being a value of a particle size below which 10% of the particles are smaller, such particles made by dispersion polymerization which comprises the steps of:

providing a two-phase system in the form of a dispersion comprising an organic phase of droplets dispersed in an aqueous medium containing a dissolved salt by mixing said organic phase in said aqueous medium under agitation and forming said droplets with less than 0.1 wt. % or without using a dispersion stabilizing agent to stabilize the dispersion, wherein the organic phase comprises at least a crosslinkable monomer, a polymerization initiator and an organic solvent for said monomer; and allowing the crosslinkable monomer to polymerize, while the two-phase system is agitated without adding of additional organic phase during said polymerization.

2. Method according to claim 1, wherein the organic phase comprises at least two monomers, of which one is a crosslinkable monomer and one is a non-crosslinkable monomer.

3. Method according to claim 1 or 2, wherein the crosslinkable monomer is a hydrocarbon comprising two or more vinyl groups.

4. Method according to claim 2, wherein the non-crosslinkable monomer is a hydrocarbon comprising one vinyl group.

5. Method according to claim 1 or 2 or 4, wherein the crosslinkable monomer is reacted in the presence of a free radical initiator.

6. Method according to claim 1 or 2 or 4, wherein the aqueous medium comprises a dissolved salt.

7. Method according to claim 1 or 2 or 4, wherein said organic solvent for a monomer is chosen from the group consisting of water-insoluble aliphatic hydrocarbons, aliphatic hydrocarbons with a hydroxyl group or a combination thereof.

8. Method according to claim 1 or 2 or 4, wherein the polymer particle is chemically modified into an IEX material.

* * * * *